(12) United States Patent
Redmond et al.

(10) Patent No.: US 8,190,530 B2
(45) Date of Patent: May 29, 2012

(54) METHOD AND SYSTEM FOR PROVIDING MULTIPLE SERVICES VIA A POINT-OF-SALE PORTAL ARCHITECTURE

(75) Inventors: Eric Redmond, Half Moon Bay, CA (US); Jean Huang, Orinda, CA (US); Pete Heisinger, Woodside, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1479 days.

(21) Appl. No.: 10/146,551

(22) Filed: May 14, 2002

(65) Prior Publication Data

US 2008/0195465 A1 Aug. 14, 2008

Related U.S. Application Data

(60) Provisional application No. 60/353,800, filed on Jan. 30, 2002.

(51) Int. Cl.
*G06Q 20/00* (2012.01)
(52) U.S. Cl. ............... 705/79; 705/16; 705/64; 715/238; 902/1; 902/32
(58) Field of Classification Search .................... 705/16, 705/17, 18, 19, 20, 21, 22, 23, 24, 25, 26, 705/27

See application file for complete search history.

(56) References Cited

U.S. PATENT DOCUMENTS

| | | | |
|---|---|---|---|
| 4,408,203 A | 10/1983 | Campbell | |
| 4,677,575 A | 6/1987 | Redin | |
| 4,788,420 A | 11/1988 | Chang et al. | |
| 4,797,920 A | 1/1989 | Stein | |
| 4,961,142 A | 10/1990 | Elliott et al. | |
| 4,992,940 A * | 2/1991 | Dworkin | ........................ 705/26 |
| 5,019,696 A | 5/1991 | Chang et al. | |
| 5,128,524 A | 7/1992 | Anglin et al. | |
| 5,136,146 A | 8/1992 | Anglin et al. | |

(Continued)

FOREIGN PATENT DOCUMENTS

WO    WO 99/21141    *    4/1999

(Continued)

OTHER PUBLICATIONS

White, Ron, How Computers Work, Millennium Ed., Que Corporation, Sep. 22, 1999.*

(Continued)

*Primary Examiner* — Jamie Kucab
(74) *Attorney, Agent, or Firm* — Kilpatrick Townsend & Stockton LLP

(57) ABSTRACT

A secure point-of-sale (POS) portal architecture for delivering multiple services is provided. According to one exemplary aspect of the architecture, a number of services offered by various parties are integrated for delivery to merchants. The parties offering the services include, for example, payment processors and merchant acquirers and other external value-added service providers. The integrated services, in turn, are offered to merchants and/or their respective customers via one or more POS devices and its supporting system infrastructure at the merchant locations. The integrated services include, for example, acceptance of multiple payment instruments, payment processing, user dialog management, sales promotion and customer support, loyalty programs, back office processing, receipt capture, employee training, risk management, dispute resolution, system security, system administration etc. Moreover, these integrated services may be customized based on a merchant's particular requirements to provide a specific environment for delivering these services.

18 Claims, 3 Drawing Sheets

U.S. PATENT DOCUMENTS

| | | | |
|---|---|---|---|
| 5,164,576 A | 11/1992 | Anglin et al. | |
| 5,173,238 A | 12/1992 | Chang et al. | |
| 5,173,597 A | 12/1992 | Anglin | |
| 5,175,682 A | 12/1992 | Higashiyama et al. | |
| 5,180,905 A | 1/1993 | Chen et al. | |
| D333,658 S | 3/1993 | Sasaki | |
| 5,256,867 A | 10/1993 | Chen | |
| 5,263,164 A | 11/1993 | Kannady et al. | |
| 5,266,789 A | 11/1993 | Anglin et al. | |
| 5,324,922 A | 6/1994 | Roberts | |
| 5,394,459 A | 2/1995 | Djuphammar et al. | |
| 5,438,184 A | 8/1995 | Roberts et al. | |
| 5,522,087 A | 5/1996 | Hsiang | |
| 5,526,425 A | 6/1996 | Meyer et al. | |
| 5,557,516 A | 9/1996 | Hogan | |
| 5,577,118 A | 11/1996 | Sasaki et al. | |
| 5,590,197 A * | 12/1996 | Chen et al. | 705/65 |
| 5,592,378 A * | 1/1997 | Cameron et al. | 705/27 |
| 5,592,611 A * | 1/1997 | Midgely et al. | 714/4 |
| 5,621,797 A | 4/1997 | Rosen | |
| 5,664,110 A * | 9/1997 | Green et al. | 705/26 |
| 5,696,909 A | 12/1997 | Wallner | |
| 5,704,046 A | 12/1997 | Hogan | |
| 5,705,798 A | 1/1998 | Tarbox | |
| 5,706,442 A * | 1/1998 | Anderson et al. | 705/27 |
| 5,724,423 A | 3/1998 | Khello | |
| 5,748,720 A | 5/1998 | Loder | |
| 5,793,964 A * | 8/1998 | Rogers et al. | 709/202 |
| 5,794,039 A * | 8/1998 | Guck | 707/103 R |
| 5,794,221 A * | 8/1998 | Egendorf | 705/40 |
| 5,808,283 A | 9/1998 | Stanton et al. | |
| 5,812,668 A | 9/1998 | Weber | |
| 5,812,765 A * | 9/1998 | Curtis | 709/200 |
| 5,815,657 A | 9/1998 | Williams et al. | |
| 5,819,175 A | 10/1998 | Niemi | |
| 5,825,884 A * | 10/1998 | Zdepski et al. | 705/78 |
| 5,826,029 A * | 10/1998 | Gore et al. | 709/227 |
| 5,828,840 A | 10/1998 | Cowan et al. | |
| 5,828,875 A | 10/1998 | Halvarsson et al. | |
| 5,832,459 A * | 11/1998 | Cameron et al. | 705/26 |
| 5,839,117 A * | 11/1998 | Cameron et al. | 705/27 |
| 5,844,219 A | 12/1998 | Wallner | |
| 5,850,446 A | 12/1998 | Berger et al. | |
| 5,878,215 A | 3/1999 | Kling et al. | |
| 5,884,297 A | 3/1999 | Noven | |
| 5,887,266 A | 3/1999 | Heinonen et al. | |
| 5,889,863 A | 3/1999 | Weber | |
| 5,897,622 A | 4/1999 | Blinn et al. | |
| 5,901,287 A * | 5/1999 | Bull et al. | 709/218 |
| 5,923,735 A * | 7/1999 | Swartz et al. | 379/93.12 |
| 5,931,917 A | 8/1999 | Nguyen et al. | |
| 5,933,812 A | 8/1999 | Meyer et al. | |
| 5,943,687 A | 8/1999 | Liedberg | |
| 5,963,924 A | 10/1999 | Williams et al. | |
| 5,969,319 A | 10/1999 | Wallner | |
| 5,974,146 A | 10/1999 | Randle et al. | |
| 5,978,840 A | 11/1999 | Nguyen et al. | |
| 5,979,757 A * | 11/1999 | Tracy et al. | 235/383 |
| 5,983,208 A | 11/1999 | Haller et al. | |
| 5,987,132 A | 11/1999 | Rowney | |
| 5,991,626 A | 11/1999 | Hinz et al. | |
| 5,991,738 A * | 11/1999 | Ogram | 705/26 |
| 5,996,076 A | 11/1999 | Rowney et al. | |
| 6,002,767 A | 12/1999 | Kramer | |
| 6,003,019 A | 12/1999 | Eaton et al. | |
| 6,006,097 A | 12/1999 | Hournfeldt et al. | |
| 6,012,050 A | 1/2000 | Eaton et al. | |
| 6,014,561 A | 1/2000 | Moulne | |
| 6,016,484 A | 1/2000 | Williams et al. | |
| 6,026,379 A | 2/2000 | Haller et al. | |
| 6,029,887 A | 2/2000 | Furuhashi et al. | |
| 6,052,581 A | 4/2000 | O'Connell et al. | |
| 6,061,665 A | 5/2000 | Bahreman | |
| 6,064,885 A | 5/2000 | Rouhollahzadeh et al. | |
| 6,065,120 A * | 5/2000 | Laursen et al. | 726/5 |
| 6,072,870 A | 6/2000 | Nguyen et al. | |
| 6,078,806 A | 6/2000 | Heinonen et al. | |
| 6,101,483 A * | 8/2000 | Petrovich et al. | 705/26 |
| 6,112,191 A | 8/2000 | Burke | |
| 6,119,105 A | 9/2000 | Williams et al. | |
| 6,178,409 B1 | 1/2001 | Weber et al. | |
| 6,182,891 B1 | 2/2001 | Furuhashi et al. | |
| 6,185,428 B1 | 2/2001 | Kingdom et al. | |
| 6,188,752 B1 | 2/2001 | Lesley | |
| 6,195,694 B1 * | 2/2001 | Chen et al. | 709/220 |
| 6,219,692 B1 * | 4/2001 | Stiles | 709/201 |
| 6,223,209 B1 * | 4/2001 | Watson | 709/201 |
| 6,260,027 B1 | 7/2001 | Takahashi et al. | |
| 6,272,472 B1 | 8/2001 | Danneels et al. | |
| 6,286,029 B1 * | 9/2001 | Delph | 709/203 |
| 6,292,786 B1 | 9/2001 | Deaton et al. | |
| 6,295,448 B1 | 9/2001 | Hayes, Jr. et al. | |
| 6,298,373 B1 * | 10/2001 | Burns et al. | 709/203 |
| 6,308,887 B1 * | 10/2001 | Korman et al. | 235/379 |
| 6,311,154 B1 | 10/2001 | Gersho et al. | |
| 6,311,165 B1 | 10/2001 | Coutts et al. | |
| 6,311,171 B1 | 10/2001 | Dent | |
| 6,315,193 B1 | 11/2001 | Hogan | |
| 6,318,536 B1 * | 11/2001 | Korman et al. | 194/217 |
| 6,327,570 B1 | 12/2001 | Stevens | |
| 6,333,976 B2 | 12/2001 | Lesley | |
| 6,363,497 B1 * | 3/2002 | Chrabaszcz | 714/13 |
| 6,370,580 B2 * | 4/2002 | Kriegsman | 709/226 |
| 6,401,074 B1 | 6/2002 | Sleeper | |
| 6,418,416 B1 * | 7/2002 | Rosenberg et al. | 705/28 |
| 6,424,845 B1 * | 7/2002 | Emmoft et al. | 455/575.1 |
| 6,460,020 B1 | 10/2002 | Pool et al. | |
| 6,484,146 B2 | 11/2002 | Day et al. | |
| 6,505,170 B1 | 1/2003 | Seifert et al. | |
| 6,516,302 B1 | 2/2003 | Deaton et al. | |
| 6,523,011 B1 * | 2/2003 | Mihatsch | 705/70 |
| 6,546,441 B1 | 4/2003 | Lum | |
| 6,587,835 B1 * | 7/2003 | Treyz et al. | 705/14 |
| 6,609,104 B1 | 8/2003 | Deaton et al. | |
| 6,611,811 B1 | 8/2003 | Deaton et al. | |
| 6,615,253 B1 * | 9/2003 | Bowman-Amuah | 709/219 |
| 6,853,977 B1 * | 2/2005 | Niwa | 705/21 |
| 7,236,942 B1 * | 6/2007 | Walker et al. | 705/14 |
| 2001/0027441 A1 | 10/2001 | Wankmueller | |
| 2001/0034711 A1 * | 10/2001 | Tashenberg | 705/52 |
| 2002/0007320 A1 | 1/2002 | Hogan et al. | |
| 2002/0010633 A1 * | 1/2002 | Brotherston | 705/26 |
| 2002/0074398 A1 * | 6/2002 | Lancos et al. | 235/382 |

FOREIGN PATENT DOCUMENTS

| | | | |
|---|---|---|---|
| WO | WO 99/28830 | * | 6/1999 |

OTHER PUBLICATIONS

Derfler, Frank J. et. al. How Networks Work, Millennium Ed., Que Corporation, Aug. 23, 2000.*

Gralla, Preston, How the Internet Works, Millennium Ed., Que Corporation, Sep. 23, 1999.*

Muller, Nathan J., Desktop Encyclopedia of the Internet, Artech House, Inc., 1998.*

Bragg, Steven M., Accounting Best Practices, John Wiley and Sons, Inc., 1999.*

Keyes, Jessica, Handbook of Technology in Financial Services 1999, CRC Press, LLC, 1999.*

The Bank Credit Card Business, 2nd Edition, American Bankers Association, 1996.*

U.S. Appl. No. 10/162,035, filed Jun. 2002, Redmond et al.

* cited by examiner

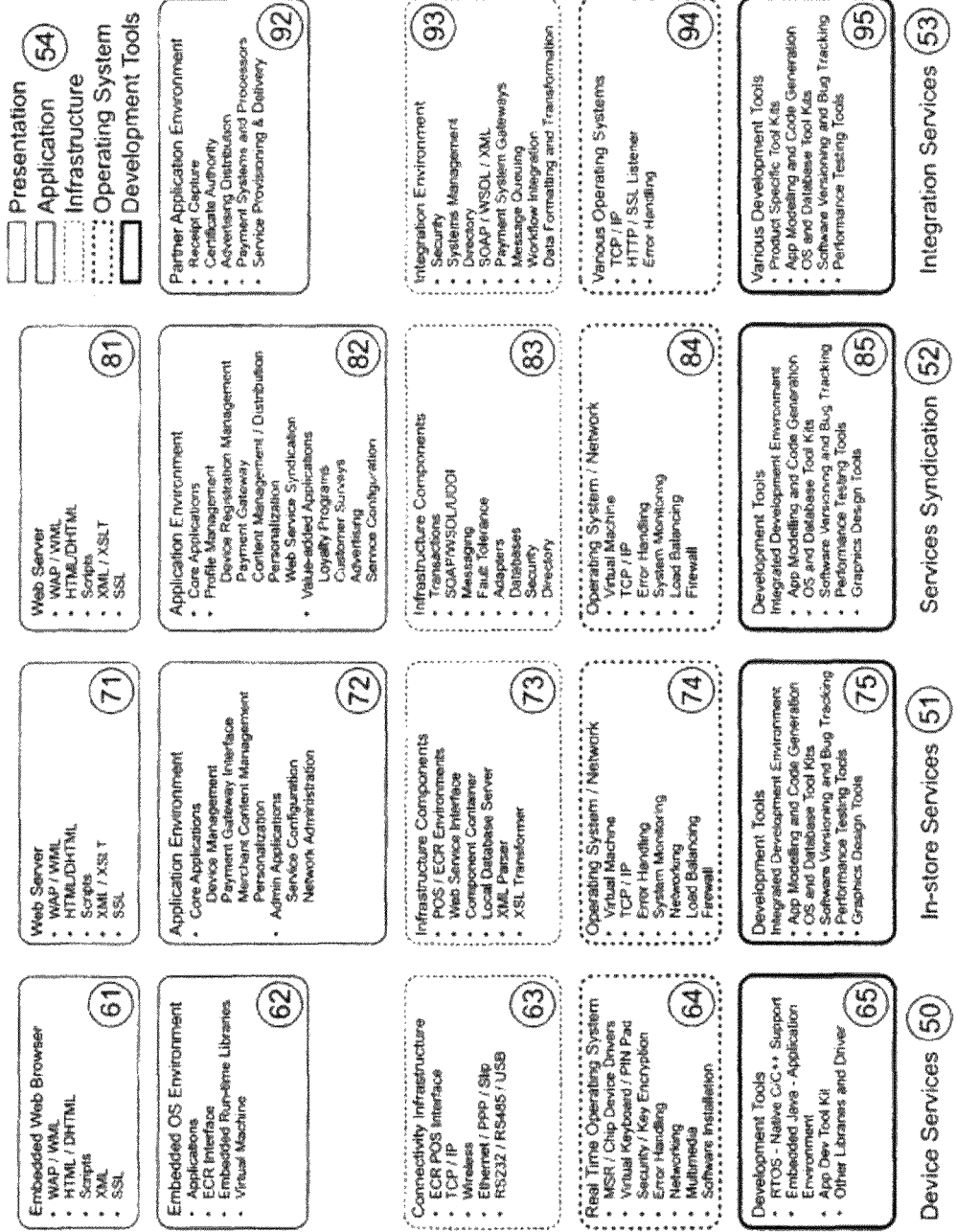

METHOD AND SYSTEM FOR PROVIDING MULTIPLE SERVICES VIA A POINT-OF-SALE PORTAL ARCHITECTURE

CROSS-REFERENCES TO RELATED APPLICATIONS

The present application claims the benefit of priority under 35 U.S.C. §119 from U.S. Provisional Patent Application Ser. No. 60/353,800, entitled "METHOD AND SYSTEM FOR PROVIDING MULTIPLE SERVICES VIA A POINT-OF-SALE PORTAL ARCHITECTURE" filed on Jan. 30, 2002, the disclosure of which is hereby incorporated by reference in its entirety for all purposes.

BACKGROUND OF THE INVENTION

The present invention generally relates to a new retail point-of-sale (POS) service architecture. More specifically, the present invention relates to a method and system for providing multiple services via a point-of-sale portal architecture.

With the rapid development of the Internet and e-commerce, current merchant point-of-sale delivery systems are at a state of imminent change. At the center of this shift are consumers with little discretionary time and expectations for convenience and personal attention from merchants. Aware of how consumers are viewing commerce, merchants want to leverage these developments, as they always have, to increase sales, reduce costs and ensure customer loyalty.

Current retail POS systems are essentially static and are ineffective in delivering new personalized services. For the most part, today's POS infrastructure is designed primarily to facilitate consumer payment authorization and provides very limited capability for non-payment business services. As a result, current POS infrastructure supports almost exclusively magnetic stripe debit and credit cards. Implementing new functionality and services at a current POS terminal is difficult, slow and expensive. Hence, it would be desirable to provide a new POS portal architecture that is capable of delivering new functionality and services as well as accommodating additional alternative payment instruments and devices.

SUMMARY OF THE INVENTION

The present invention takes advantage of the business environment created by the Internet. An exemplary embodiment of the present invention integrates a merchant's physical and Internet channels forming a comprehensive point-of-service environment. Furthermore, this environment also allows for the customization of services specific to each merchant, its customers and/or service provider.

According to one exemplary aspect of the present invention, a number of services offered by various parties are integrated at the POS service portal for delivery to merchants. The parties offering the services include, for example, payment processors, merchant acquirers and other external value-added service providers. The integrated services, in turn, are offered to merchants and/or their respective customers via one or more POS devices and its supporting system infrastructure at the merchant locations. The integrated services include, for example, payment processing, user dialog management, sales promotion and customer support, loyalty programs, back office processing, employee training, risk management, dispute resolution, system security, system administration etc. Moreover, these integrated services may be customized based on a merchant's particular requirements to provide a specific environment for delivering these services.

According to one exemplary embodiment of the present invention, the architecture includes one or more POS devices, an in-store appliance server and a services syndication hub. The services syndication hub integrates third-party services received from various service providers and configures the integrated services for delivery to the in-store appliance server. The in-store appliance server, in turn, configures the integrated services to be delivered to the POS devices so as to accommodate the different capabilities of POS devices.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. Like reference numbers indicate identical or functionally similar elements.

BRIEF DESCRIPTION OF THE DRAWINGS

FIG. 3 is a simplified block diagram illustrating an exemplary embodiment of the software architecture of the point-of-sale portal architecture in accordance with the present invention.

DETAILED DESCRIPTION OF THE INVENTION

Figure 1:
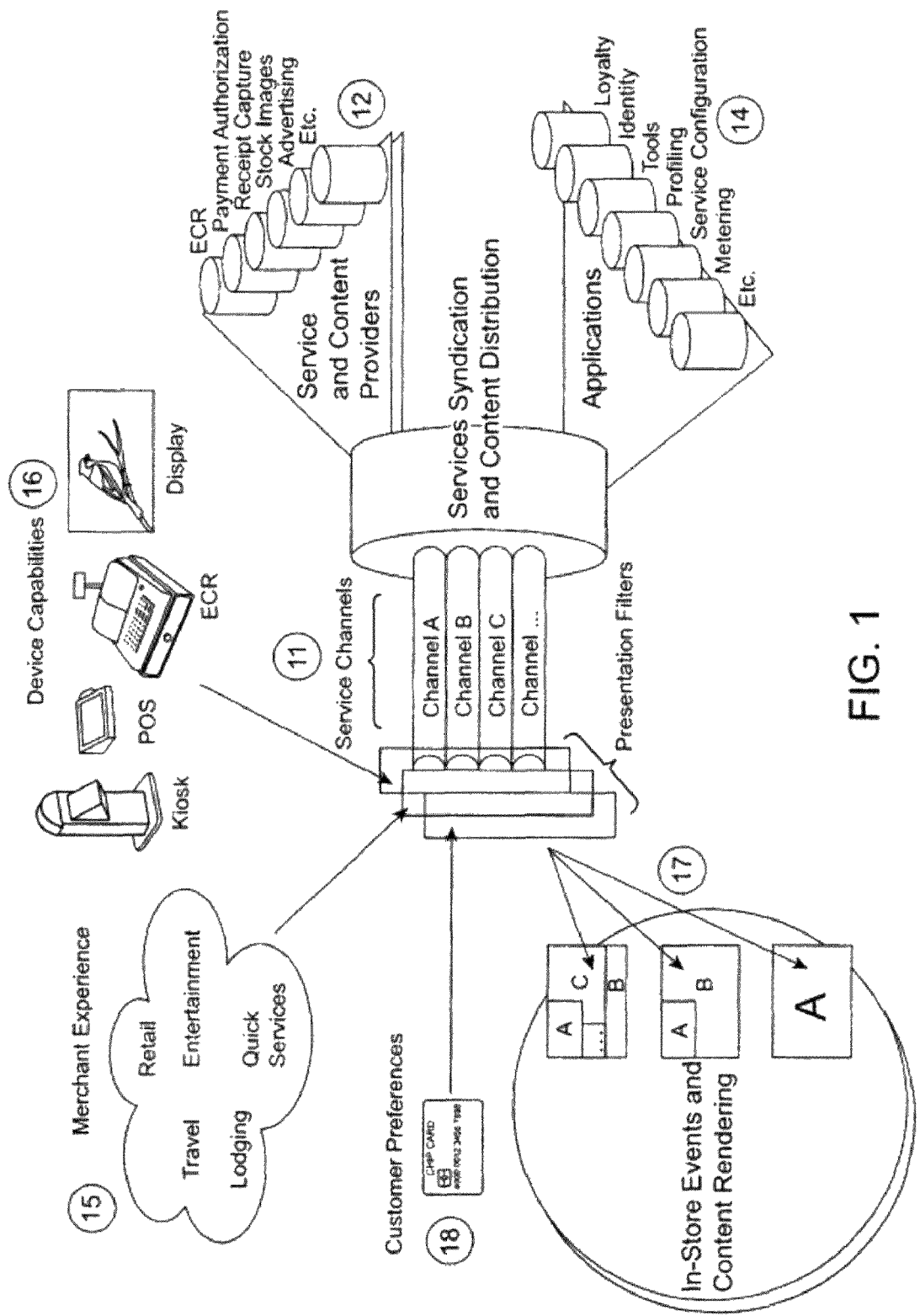
FIG. 1 is a simplified schematic diagram illustrating the logical design of an exemplary embodiment of a point-of-sale portal architecture in accordance with the present invention.

The present invention in the form of one or more exemplary embodiments will now be described. According to an exemplary embodiment of the present invention, a point-of-sale portal architecture ("POS Portal") is provided to deliver a syndication of value-added services using Internet based technologies. In one exemplary embodiment, the POS Portal includes a POS device that supports a browser, an in-store appliance server that manages dialogs for the POS device and a services syndication hub that aggregates various services requested by the in-store appliance server. The POS Portal employs Internet connectivity, network and system security, and universal access control. The use of the POS Portal allows merchants and affiliated service providers to configure specific interactive dialogs and contents for their customers. The POS Portal further allows the merchants to tailor the merchandising and the transaction flows to enhance the customer's shopping experience at the store. Moreover, the POS Portal provides the functionality to collect and analyze transaction patterns for statistics and risk management purposes. The POS Portal also enables the authorization of all major payment instruments and supports a variety of authentication methods including magnetic stripe, chip, PIN, and biometric mechanisms. Furthermore, the POS Portal is secure and allows for trust-based security integration of merchant and service provider systems. FIG. 1 illustrates the logical design of an exemplary embodiment of the POS Portal in accordance with the present invention.

Referring to FIG. 1, the logical design of an exemplary embodiment of the POS Portal is illustrated. The POS Portal integrates a number of services 12 offered by third party vendors or service providers. One or more of these services 12 may include trade-specialized services offered by third party vendors including, for example, electronic cash register management, payment authorization, receipt capture, and advertising. Furthermore, one or more of these services 12 preferably conform to industry standards for web services. These integrated third-party services are then offered, in whole or in part, to subscribers such as merchants. For illustrative purposes, a subscriber may be referred to as a merchant. In other words, subscribers can selectively choose or subscribe to individual one(s) of the integrated third-party services 12 according to their respective business needs. Based on the specific choice of a subscriber, the POS Portal configures and presents the selected third-party services to that subscriber.

The POS Portal also includes a number of application services 14. These application services 14 are utilized by the POS Portal to integrate, coordinate, configure and present the third-party services 12 in a seamless manner. For example, one application service includes a metering application that keeps track of the usage of each subscribed service by a subscriber thereby allowing the subscriber to be billed appropriately. Another application service includes a loyalty application that monitors the usage of each subscribed service in order to award earned credits or rewards to specific customers or merchants. In addition, these application services 14 may include specific customized services requested by a subscriber. For example, a subscriber who is a merchant may desire to offer the subscribed services for use by its customers or employees in a particular manner to provide branding or a specific "look and feel" that characterizes the merchant's brand and offerings.

As mentioned above, the POS Portal is able to offer the integrated third-party services 12 and the application services 14 to subscribers in a seamless manner. In order to do that, the POS Portal is equipped to present the third-party services 12 and the application services 14 to the subscribers in different manners depending on a number of factors, such as, the subscribers' respective business needs as well as their respective system and application requirements including, for example, the capabilities of POS devices 16 used by a particular subscriber.

For example, the merchant experience and business needs may differ due to the merchant's particular line of business 15. One subscriber may be a merchant in the travel industry while another subscriber may be in the retail business. Since different industries very often have their own particular requirements, different subscribers may choose to have different combinations of subscribed services, customization and user experience.

Services syndication and content distribution may also vary depending on the subscriber's customization requirements 11. For example, as shown in FIG. 1, a first subscriber may wish to subscribe to services A, B and C, a second subscriber may wish to subscribe to services A and B, a third subscriber may wish to subscribe to only service A, and a fourth subscriber (not shown) may wish to subscribe to services A, B and C but have these services delivered in a manner different from that of the first subscriber. Even though all four subscribers subscribe service A, service A may be presented differently by the POS Portal in each instance. The presentations and rendering 17 of the services at the subscriber's store locations can be further customized or filtered depending on the in-store events and the customer's preferences.

In addition, the services presentation may vary due to the hardware requirements of each subscriber. A subscribed service may be delivered in various manners depending on the capabilities of the POS devices 16. POS devices 16 include, for example, a POS terminal, a kiosk, an electronic cash register and a display monitor.

Furthermore, in some instances, the services presentation may also vary depending on the preferences or behavior of a subscriber's customers 18. A subscriber may choose to deliver different subscribed services to different customers. For example, a subscriber who is a retailer may choose to deliver varying levels of promotional services to target different customers based on their spending habits.

Figure 2:
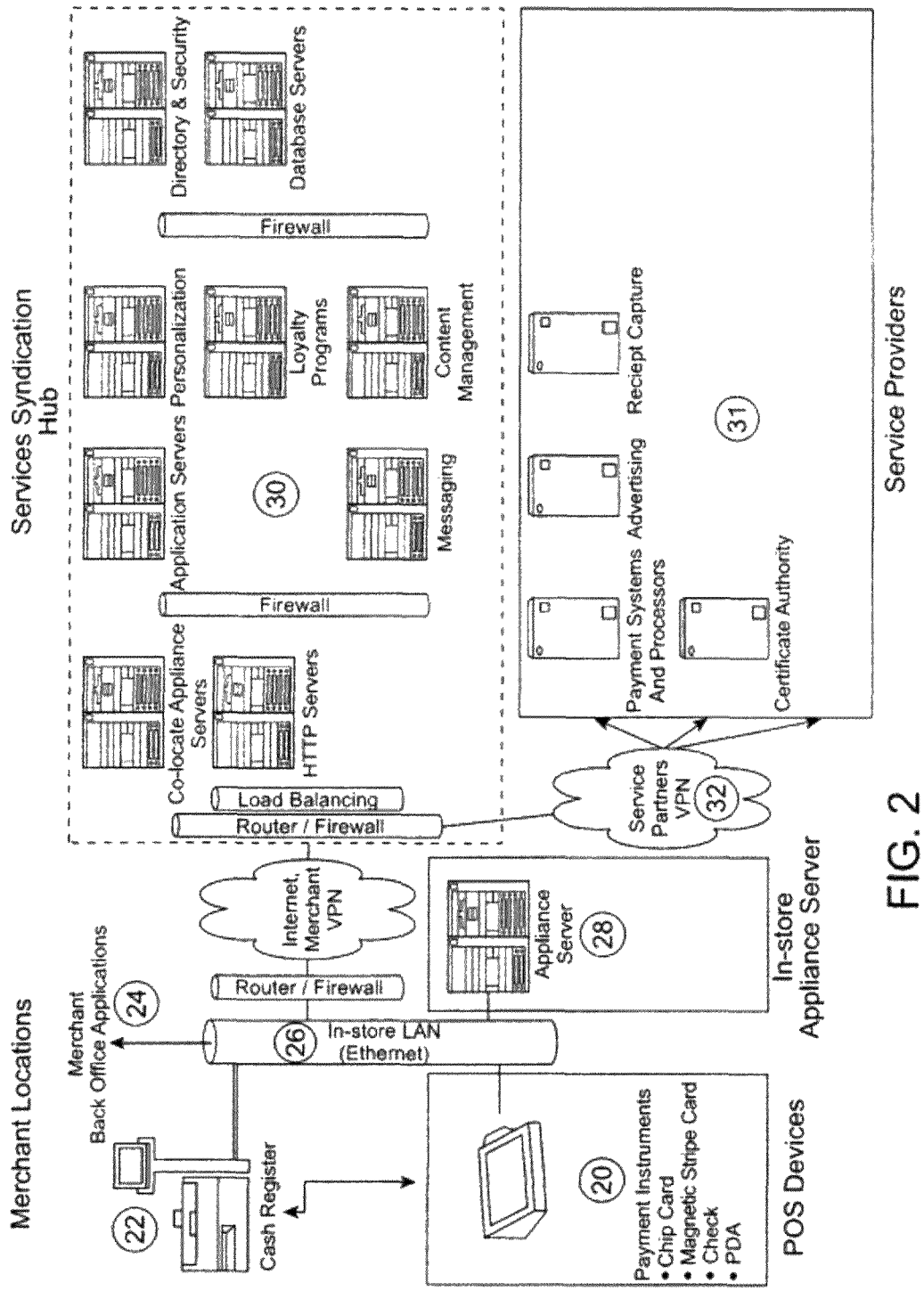
FIG. 2 is a simplified schematic diagram illustrating an exemplary embodiment of the physical architecture of the point-of-sale portal architecture in accordance with the present invention.

FIG. 2 illustrates an exemplary embodiment of the physical components of the POS Portal. The POS Portal can be conceptually categorized into three system domains, namely, the POS devices or terminals 20, in-store appliance servers 28 and a services syndication hub 30, each of which will be further described below. It should be understood that the components shown herein merely illustrate an exemplary system configuration and system interactions for each specific domain. Alternatively, for example, some application services of the POS Portal could be deployed to multiple in-store appliance servers 28 each supporting one or more POS devices 20 for performance purposes or other reasons. Based on the disclosure and teachings provided herein, a person of ordinary skill in the art will know of other ways to implement the POS Portal in accordance with the present invention.

The POS devices 20 are located at a merchant or point-of-sale location. Each of the POS devices is configured to deliver one or more of the subscribed services to a merchant's customers and/or employees. In addition, the POS devices 20 are capable of performing a number of functions including, for example, managing PIN entry, signature capturing, content rendering, providing a cash register interface, and functioning as a card reader, etc.

At the merchant location, the POS 20 devices are implemented such that they are capable of operating in conjunction with a number of existing physical merchant devices and peripherals. For example, the POS devices 20 are able to interface with an in-store network and, alternatively, deliver stand-alone operations in the event of network unavailability. In FIG. 2, a POS device 20 is, for instance, connected to both a cash register 22 and the merchant's back office applications 24 via a local area network 26. The system security protection for the POS Portal is provided by firewalls supporting SSL or virtual private network (VPN), and security modules in the POS device 20. POS devices 20 and the in-store appliance server 28 are digitally certified. Certificate-based authentication is used to authenticate the POS devices 20 before they can connect to the in-store appliance server 28 and subsequently to the services syndication hub 30. The POS Portal leverages standard Internet protocols such as TCP/IP, HTTPS, SOAP, WSDL. The POS Portal also utilizes the network transport common to the Internet including, for example, Digital Subscriber Lines (DSL), Integrated Services Digital Network (ISDN), cable modem or wireless broadband connectivity. These network access methods provide the digital data bandwidth in the range of 64 Kbps to 1.544 Mbps and higher, readily available at most merchant locations.

The POS device 20 is the primary service delivery component of the POS Portal. The POS device 20 can be configured to deliver specific services subscribed to by a particular merchant. The POS device 20 is an intelligent network device, i.e., it can host applications and process transactions from a wide range of systems and services such as the cash register 22, the in-store appliance server 28, the merchant's back office applications 24 and third party services from affiliated providers via the Internet 31. An exemplary embodiment of the POS device 20 has the following operating characteristics:

- an embedded real time operating system
- a built-in Internet browser
- a touch sensitive screen
- audio
- supports a number of peripherals (magnetic stripe, smart card reader and check readers, keyboards, printers, PIN pad, etc.)
- supports high resolution color graphics and signature image capture
- supports Internet protocols and networking (TCP/IP, Ethernet and Wireless 802.11b, Bluetooth, etc.)
- interfaces to the electronic cash register environment (ECR)
- supports field upgradeable and network loadable system and application modules
- supports EMV specifications
- supports PKI based security specifications In one exemplary embodiment, the POS device 20 has a color, touch sensitive screen that supports signature capture, printers, keyboards and other peripherals. Furthermore, the POS Portal can be implemented using Internet technologies and standards thereby enabling easy deployment and distribution of applications. Browser plug-ins, host-based applications and downloadable software components provide regular application updates for the POS device 20. This leads to user-friendly applications that are seamlessly customized to specific merchant categories, such as grocery, retail, gas stations, restaurants or other consumer sales outlets.

The POS device 20 communicates with the in-store appliance server 28 using the Internet HTTPS protocol. It should be understood that other computing devices can also be used in the POS Portal. The POS Portal can tailor the dialogs specific to the respective capabilities of these other computing devices. These other computing devices include, for example, electronic cash registers, display panels used for product discount offerings or kiosks for activities such as account setup, information inquiry, product or service configuration, etc.

The in-store appliance server 28 is configured to handle communications with the services syndication hub 30 and the POS devices 20. The in-store appliance server 28 acts as the POS service coordinator and POS content server at the merchant location. For example, the in-store appliance server 28 receives and manages services supplied by the services syndication hub 30. The services are then delivered by the in-store appliance server 28 to the POS devices 20 based on the specific requirements of the merchant. In addition, since there may be different types of POS devices 20 at a merchant location, the in-store appliance server 28 is capable of delivering the services to the POS devices 20 based on the respective capabilities or configurations of the POS devices 20. The in-store appliance server 28 then further directs the customer-POS dialog or interactions that follows the desired transaction flows.

The in-store appliance server 28 further provides flexible integration with other components of the merchant's existing systems, such as electronic cash registers 22 and merchant back office systems 24. This capability allows merchant environments to continue leveraging their technology investments. For instance, the higher bandwidth POS device 20 can enable the collection of detailed commercial card data obtained from the merchant system. In order to carry out its function, the in-store appliance server 28 manages a number of integrated services, such as, user dialog management, device management and the interface to the merchant's sales and back office functionality.

As mentioned above, the in-store appliance server 28 communicates with both the POS devices 20 and the services syndication hub 30. The in-store appliance server 28 may communicate with the POS devices 20 via a private computer network, such as, a local area network 26. In an exemplary embodiment, the in-store appliance server 28 is located at a merchant location. Alternatively, the in-store appliance server 28 may be hosted by a service provider at a location separate from the merchant location. As to communications with the services syndication hub 30, the in-store appliance server 28 may communicate with the services syndication hub 30 via either a public computer network, such as, the Internet, or a private computer network, such as, a virtual private network.

In an exemplary embodiment, the in-store appliance server 28 is implemented for a large merchant utilizing a number of servers which support packet filtering firewalls, routers, load balancing units, application servers for security, performance monitoring and screen presentation for POS devices. Exemplary characteristics of the hardware used to implement the in-store appliance server 28 are, for example, high reliability and availability, and support for server clustering and plug and play components. Physical redundancy for processors, memory, disk and power supplies are also included. For a smaller merchant this configuration can be scaled down and still provide basic in-store functionality.

The services syndication hub 30 acts as the merchant's gateway to third-party services, and coordinates the transactions between a merchant's in-store appliance server 28 and the affiliated service providers 31. The services syndication hub 30 is primarily enabled by network connectivity and middleware software interfacing to the service providers 31. The communications between the services syndication hub 30 and the third party service providers 31 may be conducted via a private computer network, such as, a virtual private network 32. In general, portions of the service processing are carried out at the data centers of the service providers 31 while the services syndication hub 30 performs a packaging and distribution role.

Furthermore, the services syndication hub 30 enforces service agreements, operating policies and regulations and rules among participating parties. For example, subscribers are likely to choose to subscribe different sets of services. The services syndication hub 30 ensures that the proper set of subscribed services is delivered to the appropriate subscriber. In addition, a service provider 31 may have different service agreements with different subscribers. As one of its functions, the services syndication hub 30 coordinates a subscribed service to be delivered to a subscriber according to the terms and conditions of the service agreement with that particular subscriber. The terms and conditions of the service agreement may specify, for example, the quality and level of service to be provided.

Also, the services syndication hub 30 ensures that the third party service providers 31 and the in-store appliance server 28 are in compliance with certain sets of operating policies and/or regulations. One such set of operating policies and/or regulations may be directed to minimum security requirements that need to be satisfied by the third party service providers 31 and the in-store appliance server 28 in order to achieve end-to-end secure communications or service delivery between a third party service provider 31 and a POS device 20.

In an exemplary embodiment, the services syndication hub 30 is implemented using high-performance processors or servers. Preferably, each processor or server has the same core reliability and availability requirements necessarily for a mission-critical data center supporting 24×7 operations. The services syndication hub 30 also includes application firewalls and proxies that ensure secure and authorized access to all services.

Moreover, in order to manage and provide the integrated third-party services, the services syndication hub 30 includes a number of infrastructure and application components. For example, the services syndication hub 30 includes a suite of applications that provide aggregation, personalization, dynamic distribution of content and connectivity between third-party services and existing payment systems. The services syndication hub 30 is able to communicate with various service providers in order to provide the integrated third-party services. These various service providers 31 include, for example, payment processors, merchant acquirers and external value-added service providers. Value-added applications for processors and acquirers can include the processing and analysis of customer survey information, administration of loyalty programs, authorization services for a variety of payment instruments and many others enabled by the POS Portal. Value-added services, such as, signature and receipt images can be captured and retrieved online for dispute resolution, reducing the time spent on this process by customers, merchants and other parties. In-store training classes can be conducted for merchant staff via the Internet. Advertising and cross selling approaches at the POS Portal can be implemented as an integral part of the merchant's overall sales process. Each system interaction is designed to comply with customer standing or employee training levels and can be altered based on seasonal sales promotions.

The POS Portal utilizes a computer network, such as, the Internet, to enable a variety of new applications and permit a consolidation of service providers. For example, merchants can accept payment instruments from checks to chip cards to digital cash and receive payment authorization from a consolidated source.

Ubiquitous, high speed Internet access provisioning has matured and is consolidating around a few well-known service providers. Given that many merchants are just beginning to upgrade their infrastructures to take advantage of the Internet, their services can be bundled with a point-of-service offering. Voice over IP and streaming video enable a variety of merchant applications including back office functions such as, store security monitoring and real time help desk technical support.

In an exemplary embodiment, the POS Portal and the network connectivity used to link up its various components are largely constructed of standard components. One of the benefits of leveraging standard technologies and development environments is the ability to readily use technology components and value-added services developed by third parties.

With the POS Portal, these value-added services can be seamlessly integrated into the point-of-service workflow. The modularity of the components allows the merchants and its service providers to assemble these components to provide the desired point-of-service capability. As described above, networking, value-added services and information is packaged around the payment authorization process to enhance revenue potential.

FIG. 3 illustrates an exemplary embodiment of the software architecture and system components used in constructing the POS Portal. The exemplary software architecture is comprised of four service domains: Device Services 50, In-store Services 51, Services Syndication 52 and Integration Services 53. The software components utilized in these service domains are further grouped by their functionality 54: Presentation, Application Environment, Infrastructure, Operating System/Network and Development Tools. The exemplary software architecture is based on object-oriented component or modular technologies. Software component architectures allow pieces of the POS Portal to be developed independently and deployed on a number of operating systems. Programming languages such as C++, Java and associated application development tools enable a highly productive development environment 65, 75, 85 and 95. Readily available software also plays a role in the POS Portal providing distributed on-line services and specialized applications. Each merchant location can deploy a variety of the POS Portal software technologies depending on the needs and the technical sophistication of the merchant.

The software architecture of the POS Portal implements standard Internet protocols such as TCP/IP, HTTPS, SOAP, WSDL as its primary communication interface within the POS Portal and with external Integration Services 53. The data formats of the POS Portal utilize standard XML schema, HTML, and other industry data conventions for the system compatibility and interoperability of service offerings. The software components of the POS Portal are digitally signed to ensure that they are capable of running securely wherever they are deployed. The certified software components also protect the POS Portal against unauthorized or malicious use of the services. The content and transactional data, XML or non-XML formatted, are also digitally signed and encrypted to prevent unauthorized access. The security architecture of the POS Portal provides the merchants with the assurance to conduct the business in a trustworthy, secure environment.

On the left hand side of FIG. 3 are the Device Services 50 used to deploy Internet-based applications in this environment. The Device Services 50 are designed to operate in the resource-constrained environment of a POS device. Limited screen size, processor capability and memory make the price point of the device acceptable to merchants but still provide significantly more functionality than today's POS terminals. Special design considerations are examined to both maintain or improve response times for checkouts and inform or collect input from the customer or employee. User interface strategy and design are combined to maximize customer attention span for message delivery and receipt in accordance with the merchant's customer experience requirements.

The presentation functionality of the Device Services 50 is carried out by an embedded web browser 61. From security and language perspectives, the browser supports Secure Socket Layer (SSL) and standard markup and scripting (Cascade Style Sheet (CSS), Extensible Markup Language (XML), Hypertext Markup Language (HTML) and scripts). Using Internet standards allows the browser 61, the web servers 71 at the in-store appliance server 28 and the web servers 81 at the services syndication hub 30 to communicate in a secure, cohesive manner.

The application environment 62 for the POS device is a portable virtual machine kernel designed for constrained processing capabilities found in POS devices, cellular phones and PDA's. Applications in this environment can be loaded into device memory improving device boot up and response times. The web browser is the primary software component supporting the POS device's external interface and allows data exchange between POS Portal services, cash register and other applications. Additional functionality provides high-resolution graphics and audio support and ability to upgrade software via the network.

A connectivity infrastructure 63 of the Device Services 50 is provided by device driver architecture in the virtual machine. It is flexible and designed to support peripherals as well as interfaces to ECRs. Frameworks and tool kits 65 are available to support networking options.

The POS device 20 uses a Real Time Embedded Operating System (RTOS) 64 as its system platform. The RTOS performs functions supporting I/O, error handling, system storage management, etc. RTOS is designed for embedded systems and addresses areas of speed, memory size, field-upgrade ability, etc. Total device functionality is split between RTOS and virtual machine kernel, allowing each to perform system tasks suited to their respective strengths.

The In-store Services 51 are based on distributed software component architecture and are primarily hosted at the in-store appliance server 28. The configurable application environment 72 and its underlying infrastructure 73 provide the localized operating platform that meets the merchant's specific system requirements. While the POS/ECR interface and the back office integrations can be localized, most of the In-store Services 51 such as device management, payment gateway interface and content management work in conjunction with Service Syndication 52 and Integration Services 53 to form a complete, deliverable service suite. For instance, with the POS Portal architecture, the In-store Services 51 are able to support personalization and distribution of content and services received from the services syndication hub 30 and, in turn, deliver them to POS devices 20. In an exemplary embodiment, content presentation, merchant content management, security and business logic tailored to the merchant's requirements are typical merchant applications provided by the In-store Services 51.

In an exemplary embodiment, a standard web server 71 is included as part of the In-store Services 51 to provide the presentation layer for content provisioning and service delivery. The In-store Services 51 work in conjunction with firewalls, Service Syndication 52 and POS browsers to provide SSL for security. Standard scripting and markup languages are supported.

A number of system-wide applications such as device management, personalization, payment gateway are also part of the POS Portal. One such application relates to device management. The POS Portal utilizes a number of services for device authentication, presentation, monitoring and software download support. In-store Services 51 performs many of these services and has the ability to work with the device registration management of Service Syndication 52 to recognize a target device and its operating environment. Initially, most of the deployed POS devices will have known characteristics. Over time, presentation content will come from disparate parties and the diversity of POS devices accessing services will increase. The POS Portal architecture anticipates this and can accommodate this device upgrade life cycle. Using web pages as input, content rendering software working in conjunction with device management provides content adaptation according to target device capability, security features and network bandwidth. Content adaptation examples are:

Data transcoding to support device capabilities (For example, images are converted to black and white for devices that do not support color).

Data compression.

Content mode transformation, such as video into frame sets.

Classification of objects to identify and eliminate redundancy.

Prioritization of data types for transmission.

Encryption characteristics.

The POS Portal resolves many of the issues around troubleshooting and maintenance of the POS environment. For example, The In-store Services 51 have the ability to monitor the quality of service of each device and can pinpoint problems before they become an issue for the merchant. Once identified, repair can be initiated via the network or physical action taken. Another aspect of system maintenance is the ability to upgrade system features via the network. High bandwidth and portable application components make this a seamless effort.

Horizontal applications 72, 82 and vertical applications 92 delineate the application component space in the software architecture of the POS Portal. In general, horizontal applications 72, 82 are core system components usually constructed by infrastructure providers and support common service requirements regardless of the industry. Each could be customized for specific uses within a vendor provided framework. Device registration management, content distribution management and personalization are examples of horizontal applications. Vertical applications 92 are software components tailored to a particular trade and usually built by vertical industry specialists. Loyalty and virtual branding programs, advertising, manufacturing configuration, hotel, restaurant, retail and travel applications are examples of vertical applications.

One of the horizontal applications of the POS Portal relates to content management. The ability to combine content from service providers, merchants and POS applications enables more meaningful interactions to be conducted with customers. Creation, aging, approving, posting, distributing and refreshing content are workflow processes incorporated in components which may be developed by vendors for this purpose.

A further horizontal application of the POS Portal relates to personalization. Personalization enables delivery of customized content according to user profile information. Personalization, both for the merchant and customers, provides the basis for loyalty programs and enables one-to-one marketing programs. It allows a merchant to recognize when to supply information as needed and allow customers to choose how and what information they would like to receive. Each dialog interaction can be logged and analyzed to create an individual profile of preferences and characteristics. Information gleaned from a dialog assists in providing a tailor-made product matching individual choice. Developing and managing a variety of profiles is valuable to building a point-of-sale service relevant to customers and sought after by merchants.

Security, systems management, directory services, gateways, asynchronous messaging and data transformation are system services of the POS Portal's capabilities that allow integration of backend services into a coherent customer experience. Many of these services exist at all levels of the software architecture ranging from the application environment and the system infrastructure through operating systems and networks. Service location, mutual authentication, non-repudiation and service authorization are also the integral parts of the software architecture of the POS Portal.

Furthermore, the operating systems 94 on the side of the service providers are transparent to the POS Portal. The services and tools mentioned above are also applicable for Integration Services 53. There are other tools that may be implemented depending on the needs of service provider integration. For example, a message queuing product that provides a specific level of guaranteed delivery could be used to support non-repudiation or performance requirements for an application.

The POS Portal also includes a number of vertical applications 92. As described above, the POS Portal is used to aggregate, target and distribute service provider information and services. In order to perform these functions, the context and supporting systems for the integration of third-party services are provided by the infrastructure 83 and operating environment 84 of the Service Syndication 52 in FIG. 3. These types of context are incorporated into the design of the POS Portal and the integration environment 93 of the service providers. The application platform supports various business interactions defined by the POS Portal's operating rules and policies. Decisions about privacy, fee structures, dispute resolution, etc., can also be incorporated into the profile management of the POS Portal.

A vertical application in the POS Portal relates to payment processing. Payment instruments and types accepted by merchants can be expanded and the POS Portal supports various approaches including, for example, checks, micro payments, digital cash, chip and magnetic stripe card products. Information about payments is collected at various application levels across the system architecture of the POS Portal. The data from payment transactions collected at the POS device are sent to and aggregated by In-store Services 51. The payment transaction then is passed to the services syndication hub 30 via the payment gateway interface. Upon the receipt of the payment authorization request from the merchant, the Service Syndication 52, based on the established agreement and roles, chooses an appropriate payment gateway for authorization and returns the appropriate results to the merchant on completion. To interface seamlessly with merchant acquirers, payment processors and card issuers, the Service Syndication 52 emulates legacy payment messaging through vendor provided software that implements data format transformations. The transaction data can be used later in the processing flow for value-added services, such as, receipt capture, fraud detection, purchasing pattern analysis, etc. if the merchant chooses to subscribe these services.

It should be understood that other vertical applications suiting the needs of hotels, restaurants, retail stores, travel agencies and other trades could be built. Each vertical business dialog is different. In some cases, only an employee will be reviewing information from the system; in others, the dialog will be shared by employees and customers; and in yet some others, only the customers will interact with the system.

Additional vertical applications when combined with other services can potentially provide new sources of revenue to merchants. An example of this is the delivery of advertising through in-store POS devices, display panels and kiosks. Another application could recognize valued customers and prompt employees to upgrade the services or products offered during a sale. Still others could create the capability to set up co-branded loyalty programs between a number of merchants and financial institutions.

The application environment 82 of the services syndication hub 30 provides the integration of all available services in FIG. 3 ensuring an ability to incorporate a matrix of services offered by third party vendors. As mentioned above, security, system management, directory services, content management, gateways and formatting components are an integral part of the architecture.

Service providers offer an opportunity to extend their offered services through the POS Portal in a plug and play infrastructure 83. The Services Syndication 52 uses common Internet technology to link various service providers to provide these on-line services. The variety of services is not limited but as an example the following can be provided including receipt capture, certificate management, advertising, etc. Receipt capture is a service that stores purchase receipt and signature image for post-sale retrievals. The information can be retrieved online upon demand for dispute resolutions rather than using the conventional way of scanning or faxing original documents between parties. Sales documents can be displayed via a browser and e-mailed between parties for references. Certificate management can ease the merchant's burden of creating and maintaining certificates used to authenticate devices and customers, freeing up employees for other duties. Advertising creation, maintenance and distribution used for POS devices can be performed by vendors that specialize in this area.

Additional services and new payment models and systems that leverage the Internet can be integrated in the POS Portal. Increasingly, a number of vendors are developing on-line services using web services XML standards for the generation and exchange of typical business objects including purchase orders, invoices, etc. These can all be used in the POS Portal to facilitate creation, pricing, configuration and support of service and goods procurement enabled by the POS Portal.

As described above, the POS Portal of the present invention can be implemented using both software and hardware. It should be understood that the descriptions provided above are merely for illustrative purposes. It will be clear to a person of ordinary skill in the art that the present invention can be implemented in many different configurations and/or manners, using software, hardware or a combination of both.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for providing multiple services to computing devices, the system comprising:
a services syndication hub comprising a plurality of application servers and database servers, and configured to integrate a plurality of services from a plurality of service providers comprising payment processors, and provide different combinations of services to different subscribers according to the subscribers' customization requirements, wherein the subscribers are merchants, and wherein the plurality of services include authorization services for a variety of payment instruments and the administration of loyalty programs, and wherein the services syndication hub is configured to be in communication with a plurality of appliance servers providing the different combinations of services for the different subscribers and controlling the computing devices using the different combinations of services,
wherein the services syndication hub is configured to receive a payment authorization request from a merchant subscriber, and is configured to choose an appropriate gateway for authorization and returns an appropriate result to the merchant subscriber.

2. The system of claim 1 wherein the computing devices include one of the following: a point-of-sale device, an electronic cash register, a display and a kiosk.

3. The system of claim 1 wherein the computing devices are configurable to allow different services to be presented in different configurations.

4. The system of claim 1, wherein presentation and rendering of the different combinations of services at the computing devices used by the subscribers are customized according to preferences of the subscribers' customers.

5. The system of claim 1 wherein the plurality of services include a receipt capture service.

6. The system of claim 1 wherein the different combinations of services received by the plurality of appliance servers are to be presented and accessed by the subscribers and/or their customers.

7. The system of claim 1 wherein how one or more of the plurality of services received by the appliance server are to be presented and accessed by a customer are determined based on past activities of the customer.

8. The system of claim 1 wherein the plurality of services to be received by an appliance server in the plurality of appliance services are to be presented based on criteria specified by a subscriber.

9. The system of claim 1 wherein the services syndication hub enforces service agreements, operating policies and regulations among the subscribers and the service providers.

10. The system of claim 1 wherein the plurality of services include a receipt capture service, a certificate management service, and an advertising service.

11. The system of claim 1 wherein the plurality of services further comprises an advertising service.

12. The system of claim 1 wherein the services syndication hub comprises HTTP servers.

13. The system of claim 1 wherein the plurality of services comprises a certificate management service.

14. The system of claim 1 wherein the services syndication hub enforces service agreements, operating policies and rules and regulations among participating parties.

15. The system of claim 1 wherein the plurality of services comprises processing and analyzing customer survey information.

16. The system of claim 1 wherein the services syndication hub comprises a suite of applications that provide aggregation and personalization, and dynamic distribution of content and connectivity between third-party services and payment systems.

17. The system of claim 1 wherein the services syndication hub is configured to ensure that the service providers and appliance servers are in compliance with sets of operating policies and regulations.

18. The system of claim 1 further comprising the plurality of appliance servers.

* * * * *